United States Patent
Cahalane

(10) Patent No.: US 7,513,058 B2
(45) Date of Patent: Apr. 7, 2009

(54) CONSTRUCTION RULE TAPE AND LAYOUT TOOL

(75) Inventor: Michael Cahalane, 77 River Rd., Norfolk, MA (US) 02056

(73) Assignee: Michael Cahalane, Norfolk, MA (US)

( * ) Notice: Subject to any disclaimer, the term of this patent is extended or adjusted under 35 U.S.C. 154(b) by 188 days.

(21) Appl. No.: 11/423,130

(22) Filed: Jun. 8, 2006

(65) Prior Publication Data

US 2006/0277842 A1   Dec. 14, 2006

Related U.S. Application Data

(60) Provisional application No. 60/595,152, filed on Jun. 9, 2005.

(51) Int. Cl.
*G01B 3/02* (2006.01)
(52) U.S. Cl. .............. 33/494; 33/404; 33/407
(58) Field of Classification Search ............ 33/759, 33/494, 483, 755, 679.1, 561.1, 562.2, 563.3
See application file for complete search history.

(56) References Cited

U.S. PATENT DOCUMENTS

| | | | | |
|---|---|---|---|---|
| 2,904,891 A | * | 9/1959 | Cook | ............... 33/494 |
| 4,970,797 A | * | 11/1990 | Sarasin | ............... 33/494 |
| 5,012,590 A | * | 5/1991 | Wagner et al. | ............... 33/759 |
| 5,187,878 A | * | 2/1993 | Kuttner | ............... 33/719 |
| 5,724,747 A | * | 3/1998 | Poorman | ............... 33/759 |
| 2001/0022035 A1 | * | 9/2001 | Veloce | ............... 33/758 |
| 2005/0252020 A1 | * | 11/2005 | Critelli et al. | ............... 33/755 |
| 2008/0209749 A1 | * | 9/2008 | Chua | ............... 33/758 |

OTHER PUBLICATIONS

Capcity Equipment Rules and Tapes [online] [retrieved Feb. 26, 2008]. Retrieved from the Internet http://www.capcityequipment.com/mblrules.html.*
Bon Rite Rules & Tapes [online] [retrieved Sep. 7, 2006]. Retrieved from the Internet:<URL: http://www.bontool.com/product1.asp?P=Masontapes.
Bon Rite Levels & Layout Tools [online] [retrieved Sep. 7, 2006]. Retrieved from the Internet:<URL: http://www.bontool.com/product1.asp?P=Econspacingtapes.

* cited by examiner

*Primary Examiner*—Yaritza Guadalupe-McCall
(74) *Attorney, Agent, or Firm*—Kurt Rauschenbach; Rauschenbach Patent Law Group, LLC

(57) ABSTRACT

A construction rule tape and a construction layout tool include a non-metallic material that conforms to a construction surface. The non-metallic material includes graduations that correspond to a combined thickness of at least one of a gap and an adhesive material used to secure the construction unit to other construction units and to the construction surface.

9 Claims, 6 Drawing Sheets

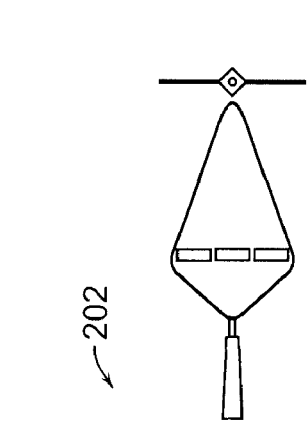
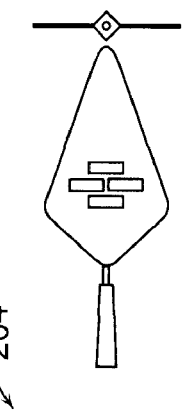
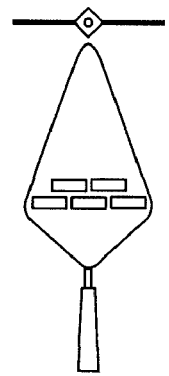
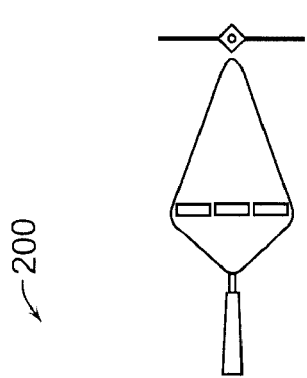
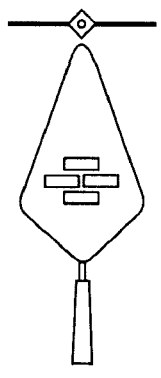
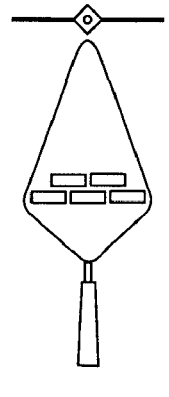
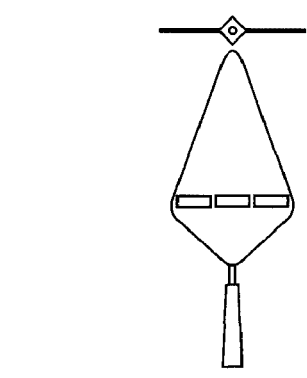
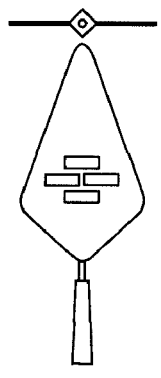
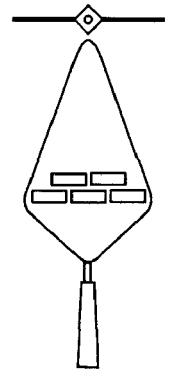
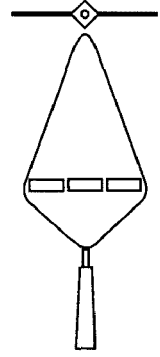
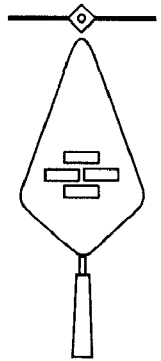
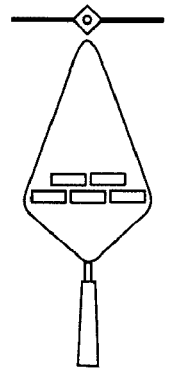
FIG. 2A     FIG. 2B     FIG. 2C

CONSTRUCTION RULE TAPE AND LAYOUT TOOL

RELATED APPLICATION SECTION

This application claims priority to U.S. Provisional Patent Application Ser. No. 60/595,152, filed Jun. 9, 2005, and entitled "Construction Layout Tool." The entire application of U.S. Provisional Patent Application Ser. No. 60/595,152 is incorporated herein by reference.

BACKGROUND OF THE INVENTION

The section headings used herein are for organizational purposes only and should not to be construed as limiting the subject matter described in the present application.

The present invention relates to construction material layout and construction layout tools. A comprehensive description of prior art construction layout techniques and tools is described in "Measuring Marking & Layout a Builder's Guide", by John Carroll, The Taunton Press, 1998, ISBN 1-56158-226-3.

BRIEF DESCRIPTION OF THE DRAWINGS

The aspects of this invention may be better understood by referring to the following description in conjunction with the accompanying drawings, in which like numerals indicate like structural elements and features in various figures. The drawings are not necessarily to scale. The skilled artisan will understand that the drawings, described below, are for illustration purposes only. The drawings are not intended to limit the scope of the present teachings in any way.

FIG. 2A illustrates masonry rule tape according to the present invention with a number three mortar thickness spacing.

FIG. 2B illustrates a masonry rule tape according to the present invention with a number four mortar thickness spacing.

FIG. 2C illustrates masonry rule tape according to the present invention with a number five mortar thickness spacing.

DETAILED DESCRIPTION

Figures 1A, 1B:
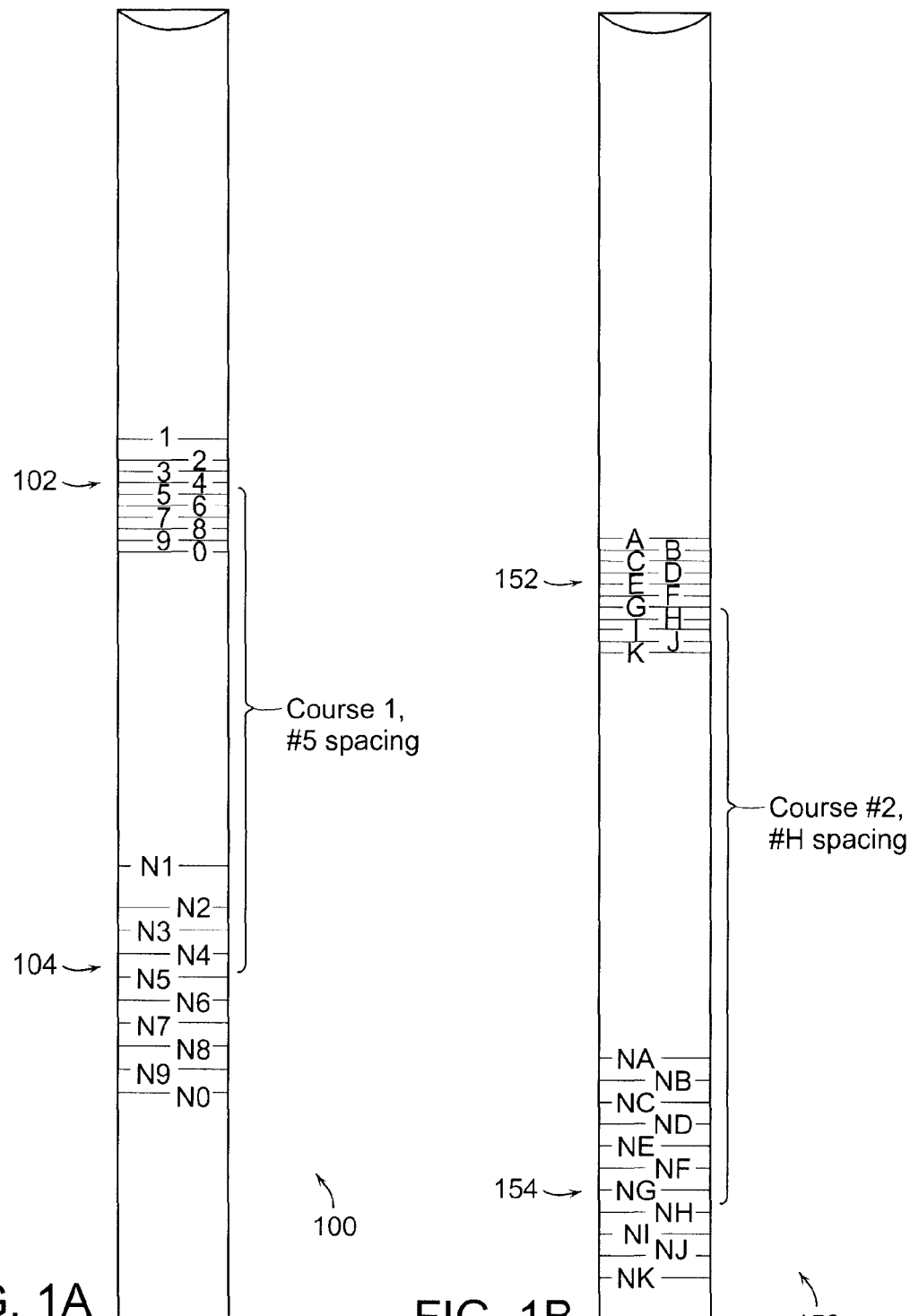
FIG. 1A illustrates graduations on a prior art standard brick spacing folding rule.
FIG. 1B illustrates a prior art oversized brick spacing folding rule.

It should be understood that the individual steps of the methods of the present invention may be performed in any order and/or simultaneously as long as the invention remains operable. Furthermore, it should be understood that the apparatus of the present invention can include any number or all of the described embodiments as long as the invention remains operable.

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

For example, although many methods and apparatus of the present invention are described in connection with masonry layout, it should be understood that the methods and apparatus of the present invention apply to any type of construction material layout. In addition, although some methods and apparatus of the present invention are presented in the context of standard spacing rules, it is understood that the methods of the present invention can be used to layout any type of construction unit with standard and/or non-standard spacing. Furthermore, although some methods and apparatus of the present invention are presented in the context of a tape apparatus, it is understood that the methods and apparatus of the present invention can be practiced by printing the desired rule directly on construction layout tools, such as story poles, and even directly on building material, such as insulation material and weatherproofing materials.

One aspect of the present invention relates to methods and apparatus for masonry layout. Craftsman such as masons needs to plan and layout their jobs carefully. Proper layout of masonry units is important to maximize the mason's productivity. Proper layout of masonry units is also important to the long-term integrity of the structure. In addition, proper layout of masonry units is important to make the mason's work visually attractive.

Masonry comes in units that have approximately uniform dimensions. Typically these units are relatively small and brittle. Masonry units are typically joined by mortar, which is a calcinated mixture that includes cement, lime, sand, and water. Mortar is a bonding agent that adheres well to masonry units and forms a strong and solid bond. Mortar conforms to masonry units and fills gaps thereby sealing the masonry units so that water and wind do not penetrate through the masonry structure.

The structural integrity of the masonry structure depends upon the quality and thickness of the masonry joints (also referred to as bed joints). In particular, the thickness of the mortar joints greatly affects the strength of the masonry structure. Some masons believe that the optimum thickness of a mortar joint (or bed joint) should be between about ¼ inch and ⁹⁄₁₆ inch. For example, head joints that are less than ¼ inch thick can be difficult to completely fill and, therefore, can form an incomplete bond, which can significantly compromise the integrity of the masonry structure. The term "head joint" refers to those masonry joints that are between two masonry units in the same course. A compromised or failed head joint can result in water and wind penetrating into the masonry structure, which can lead to a structural failure. The top layer of masonry units is especially prone to failure.

Fat masonry joints, which are typically considered to be masonry joints that are over ¾ inch thick, are also prone to structural failure. Fat masonry joints tend to shrink and this shrinkage can lead to hairline cracks that compromise the structural integrity and that allow water and wind to penetrate through the masonry structure. Structural failures with fat masonry joints are sometimes more severe if the mason uses a stiff mortar mix.

The masonry joints account for a significant fraction of the surface area of the masonry structure. For example, the masonry joints in a typical brick wall account for nearly a quarter of the surface area of the wall. Consequently, masonry joints have a significant impact on the visual beauty of the masonry structure. Fat joints are generally considered to detract from the visual beauty of the masonry structure. Also, abrupt changes in the thickness of masonry joint are generally considered to detract from the visual beauty of the masonry structure because they visually interrupt the orderly progression of the masonry units and mortar.

Masonry units can be combined in almost any shape by adjusting the mortar joint thickness. In practice, masons adjust the height and length of each masonry course by altering the thickness of the mortar joints. The term "course" refers to a layer of masonry units. Altering the thickness of the mortar joints allows masons to form the masonry structure in the desired shape. Altering the thickness of the mortar joints also allows the mason to compensate for inconsistencies in the size of the masonry units. In addition, altering the thickness of the mortar joints allows the mason to fit whole units into a given space between structures, such as windows and doors.

It is relatively difficult and time consuming to cut masonry units. In addition, cut masonry units are generally considered to be unattractive because they visually interrupt the orderly progression of the masonry units and mortar joints. Consequently, masons want to carefully plan and layout their work to avoid unnecessary cutting of masonry units. Skilled masons can avoid cutting masonry units by properly choosing and adjusting the thickness of the mortar joints used in the masonry structure.

FIG. 1A illustrates graduations on a prior art standard brick spacing folding rule 100. Such folding rules have been commercially available for many years. The term "standard brick spacing" refers to a spacing that is used with industry standard 2¼ inch high bricks. The standard brick spacing folding rule 100 includes course scales 102 that designate different brick courses. The term "course" as used herein refers to a continuous layer of building material, such as masonry units or tile, on a construction surface of a building.

The course scales 102 include uniformly marked graduations designating different brick courses. The standard brick spacing rule 100 provides ten different brick courses that are indicated by number zero through number nine for laying standard 2¼ inch high bricks. The standard brick spacing rule 100 also includes spacing scales 104 that designate different mortar thicknesses. The spacing scales 104 indicate ten different mortar thicknesses that are indicated by the numbers zero to nine. The example shown in FIG. 1A illustrates the first course with a number 5 mortar thickness.

FIG. 1B illustrates a prior art oversized brick spacing folding rule 150. The oversized brick spacing rule 150 is similar to the standard brick spacing rule. However, the oversize brick spacing rule 150 is designed to lay oversized bricks, which are 2¾ inches high. The oversized brick spacing folding rule 150 includes course scales 152 with uniformly marked graduations that designate different brick courses for laying oversized 2¾ inch high bricks. The oversized brick spacing rule 150 provides eleven different graduations indicating brick course sizes that are designated by letters A to K.

The oversized brick spacing rule 150 also includes spacing scales 154 that designate different mortar thicknesses. The oversized brick spacing rule 154 provides ten different mortar thicknesses graduations that are indicated by the letters NA to NK. Thus, the example shown in FIG. 1B illustrates the second course with a letter NH mortar thickness.

Folding rules have been used for more than a century. Many folding masonry rules are construed of wood. One problem with wooden folding masonry rules 100, 150 is that they deteriorate quickly when exposed weather and other abuses that are typically experienced by masonry tools. The course scales 102, 152 and the spacing scales 104, 154 are typically painted on the rule 100, 150. During use, the paint on the rule 100, 150 is exposed to water, mortar, and sand. Consequently, the painted graduations rapidly deteriorate.

In addition, when wooded rules are exposed to moisture the wood expands within the brass hinges connecting the sections of the rule. When the wood dries, the brass hinges loosen causing the rules to loose their accuracy. Once masonry rules 100, 150 loose their accuracy, they are no longer useful and are typically discarded. It is not uncommon for masons to discard wooden masonry rules after only several weeks of use. Some masonry folding rules are made of fiberglass instead of wood. These fiberglass rules have a longer working life.

Another problem with folding masonry rules is that they are rigid and can not be bent to conform to curved structures. In addition, folding masonry rules have only discrete lengths. Masons using folding masonry rules to join masonry units that form arches and other curves surfaces must estimate the mortar thickness applied because the folding rules do not conform well to these construction surfaces. Yet another problem with folding masonry rules that they are not designed to adhere to construction layout tools, such as story pole or other guides to layout the courses of construction materials.

FIG. 2A-C illustrates one embodiment of the masonry rule tape 200 of the present invention for laying out masonry units with three different mortar thicknesses. One aspect of the method of the present invention is that the mortar thickness spacing can be indicated in a numeric or a non-numeric manner. For example, symbols such as trowels and other indicators, such as colors, can be used to visually indicate the spacing. In addition, the layout tape can contain advertising materials.

FIG. 2A illustrates layout tape 200 according to the present invention with a number three mortar thickness spacing. In the following description the layout tape 200 is described in connection with layout masonry units. However, it should be understood that the layout tape of the present invention can be used to layout any type of construction unit as described herein.

The layout tape 202 includes lines that indicate the mortar thickness spacing. The spacing between the lines is 2$\frac{9}{16}$ inches, which corresponds to a standard 2¼ inch brick and a $\frac{5}{16}$ inch mortar joint. In this embodiment of the masonry rule tape, three bricks are printed inside a trowel to visually indicate to the mason that the layout tape is spaced with a number three mortar thickness spacing. Numerous other types of visual indicator can also be used. For example, in one commercial embodiment of the layout tape of the present invention, the tape includes the number three and/or is manufactured with a color, such as red, to indicate that it has the number three mortar thickness spacing.

FIG. 2B illustrates a masonry rule tape 204 according to the present invention with a number four mortar thickness spacing. The spacing between the lines is 2⅝ inches, which corresponds to a 2¼ inch brick and a ⅜ inch mortar joint. In this embodiment of the masonry rule tape, four bricks are printed inside a trowel to visually indicate to the mason that the layout tape is spaced with a number four mortar thickness spacing. Numerous other types of visual indicator can also be used. For example, in one commercial embodiment of the layout tape of the present invention, the tape includes the number four and/or is manufactured with a color, such as green, to indicate that it has the number four mortar thickness spacing.

FIG. 2C illustrates masonry rule tape 206 according to the present invention with a number five mortar thickness spacing. The spacing between the lines is 2$\frac{11}{16}$ inches, which corresponds to a 2¼ inch brick and a ⁷⁄₁₆ inch mortar joint. In this embodiment of the masonry rule tape, five bricks are printed inside a trowel to visually indicate to the mason that the layout tape is spaced with a number five mortar thickness spacing. Numerous other types of visual indicator can also be used. For example, in one commercial embodiment of the layout tape of the present invention, the tape includes the number five and/or is manufactured with a color, such as blue, to indicate that it has the number five mortar thickness spacing.

Commercial embodiments of the layout tape shown in FIG. 2 can be manufactured in rolls of any size. One advantage of the masonry rule tape of the present invention is that it can be manufactured to be any length. In some embodiments, it is in the form of a roll that can be hundreds of feet long. Commercial embodiments of the layout tape shown in FIG. 2 can also be in any width. For example, the width of the layout tape can be one inch so that it can be applied directly to standard one inch wide tape measures.

In one embodiment, the layout tape of the present invention includes lines that indicate more than one mortar thickness spacing. For example, in one embodiment, the layout tape of the present invention includes lines that indicate the entire standard or oversize brick rule.

Figure 3:
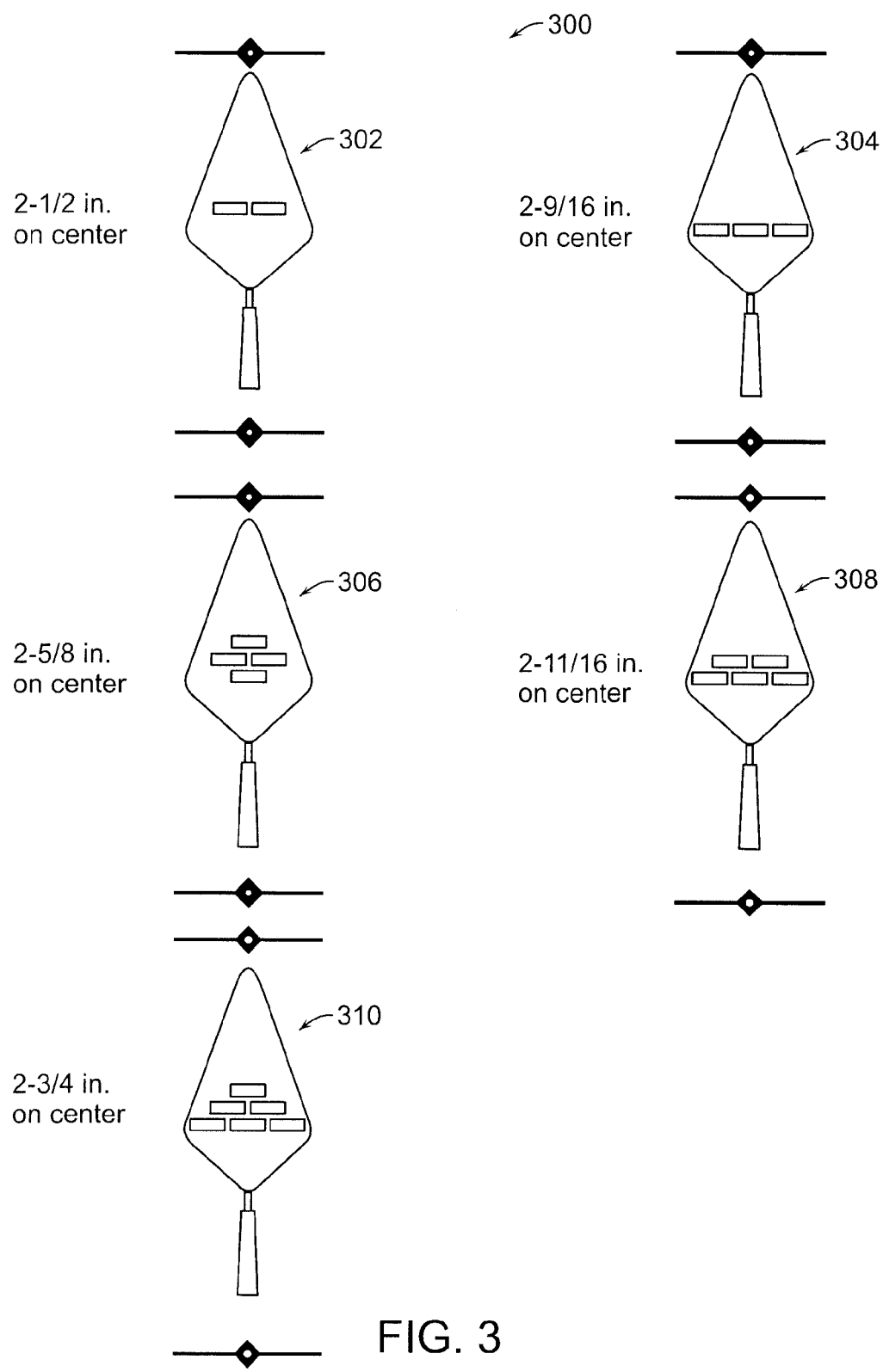
FIG. 3 illustrates one section of the layout tape according to the present invention indicating the number two through the number six mortar thickness.

FIG. 3 illustrates one section of the layout tape 300 according to the present invention indicating the number two through the number six mortar thickness. The number two section 302 of the layout tape has a spacing of 2½ inches, which corresponds to a mortar joint thickness of ¼ inch. In one commercial embodiment, the number two section 302 is yellow. The number three section 304 of the layout tape has a spacing of 2⁹⁄₁₆ inches, which corresponds to a mortar joint thickness of ⁵⁄₁₆ inch. In one commercial embodiment, the number three section 304 is red.

The number four section 306 of the layout tape has a spacing of 2⅝ inches, which corresponds to a mortar joint thickness of ⅜ inch. In one commercial embodiment, the number four section 306 is green. The number five section 308 of the layout tape has a spacing of 2¹¹⁄₁₆ inches, which corresponds to a mortar joint thickness of ⁹⁄₁₆ inch. In one commercial embodiment, the number five section 308 is blue. The number six section 310 of the layout tape has a spacing of 2¾ inches, which corresponds to a mortar joint thickness of ½ inch. In one commercial embodiment, the number six section 308 is orange.

In many embodiments, the layout tape according to the present invention conforms to the construction surface. In one embodiment, the layout tape according to the present invention is formed of a very low shrinkage material. For example, the layout tape of the present invention can be formed of UPVC or other similar materials. Such materials have only minimal shrinkage when stored over the lifetime of the tape. Furthermore, such materials have minimal shrinkage when exposed to weather and other abuses that are typical of masonry tools. In one embodiment of the present invention, the dimensions of the layout tape are chosen to reduce shrinkage of the tape when exposed to weather and other abuses.

In one embodiment, the layout tape includes an adhesive material on at least one side that bonds the layout tape to a structure, such as a construction layout tool or a construction surface. In one embodiment, the graduations and other markings on the layout tape, such as the trowel with three bricks or numbers, are printed on the adhesive side of the layout tape before the adhesive material is applied. In some embodiments, the adhesive material and the layout tape material are chosen to reduce the formation of bubbles when the layout tape is applied to a surface. In this embodiment, the markings are not directly exposed to weather and other abuses that are typically experienced by masonry tools.

It should be understood that the layout tape of the present invention can be used to layout any type of construction unit. For example, the layout tape of the present invention can be used to layout stud materials (as described herein in connection with FIG. 6), roofing material, insulation material, and sidewall material, such as vinyl siding, clapboard siding (cedar), and fiber cement board siding. The layout tape of the present invention can also be used to layout studding material, which is typically laid out on 16 inch centers. The layout tape used to layout these construction materials includes graduation and marking that are chosen to match the dimensions of these construction units and any spaces and/or bonding materials between the construction units.

Figure 4:
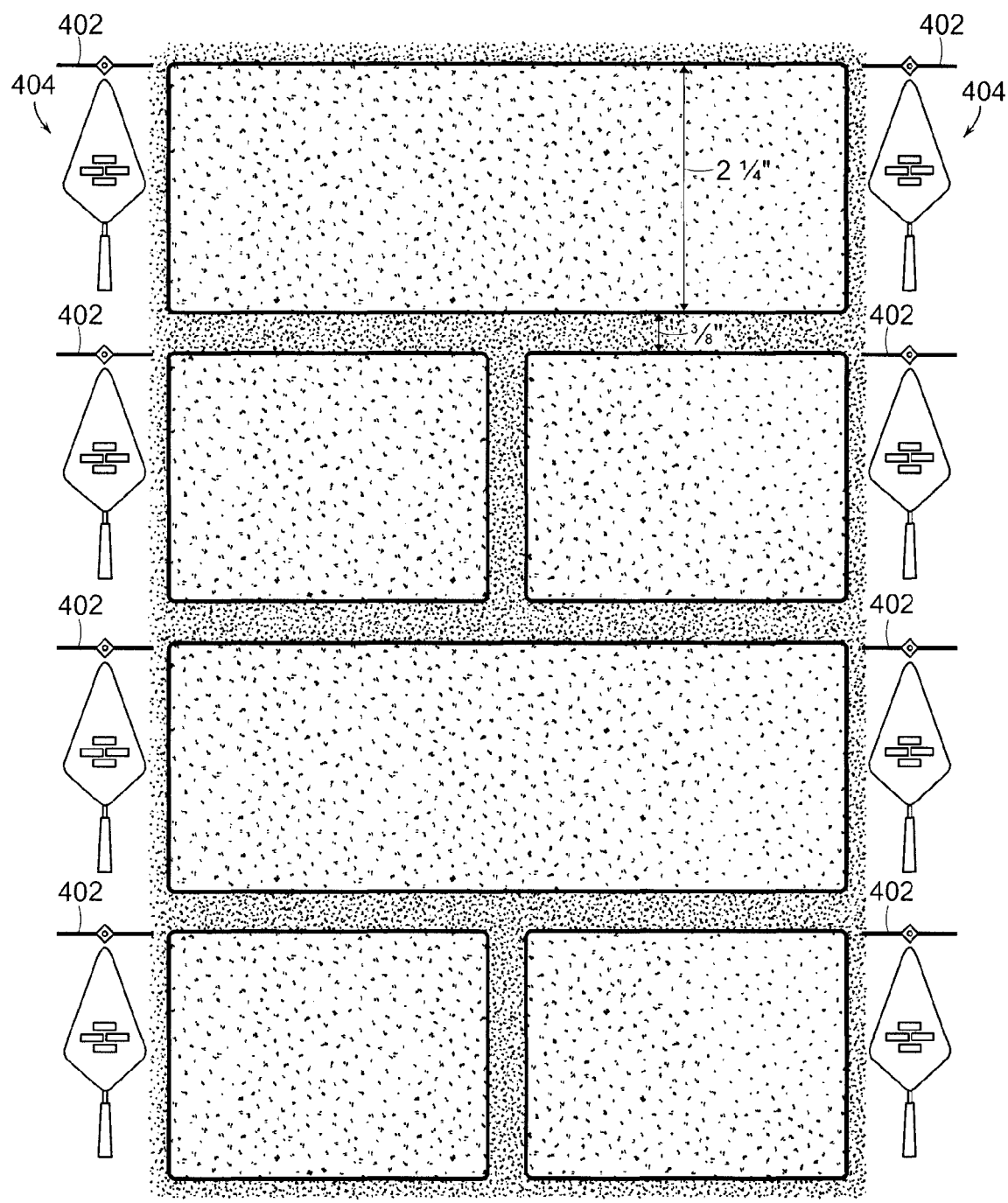
FIG. 4 is a drawing that illustrates masonry layout using the layout tape of the present invention.

FIG. 4 is a drawing that illustrates masonry layout using the layout tape of the present invention. The drawing in FIG. 4 illustrates the layout of four courses with a number four mortar joint spacing. Masons sometime refer to this layout type of layout as a four-on-four layout. The spacing between the lines 402 of the layout tape 404 is 2⅝ inches. The joint spacing for a standard 2¼ inch brick is ⅜ inch.

In practice, masons will first establish one or more top lines. The top lines represent the top of a course of brick and serves as a reference or starting point for measuring and marking the other courses. For example, a top line in a one-story house can be positioned about 5¼ inches below the underside of the windowsills. A top line with such a dimension will leave enough room for a brick sill that goes underneath the windowsill.

The mason then positions the layout tape rule so that the end of the layout tape is level with the top line. The mason then goes down the length of the tape and marks the masonry unit spacing for each course. Adjusting the thickness of the mortar joint so that the masonry unit and the mortar joint have a combined thickness where the top of the brick is level with the lines on the layout tape will result in even courses. Masons desire even courses, especially on tall narrow masonry structures like chimneys and brick veneers where non-uniform courses are particularly noticeable.

The layout tape of the present invention has many advantages. One advantage of the layout tape of the present invention is that it can conform to any surface. For example, the layout tape can be bent around an arch or even a ninety degree corner. In one embodiment, the layout tape of the present invention is formed of a non-metallic material that can easily conform to any surface.

Non-metallic tape materials are desirable because metallic tapes generally do not conform well to many surfaces because their metallic material is relatively stiff. Also, metallic tapes do not conform well to many surfaces because they are usually cambered and difficult to lay flat. Furthermore, metallic tapes do not keep their shape because their metallic material tends to recoils back to its original position. Furthermore, metallic tapes are also subject to metal fatigue.

Another aspect of the present invention is a construction layout tool. A construction layout tool according to the present invention is a layout structure that includes a surface having the graduations and markings of the layout tape described herein. In some embodiments of the invention, the construction layout tool comprises a layout structure with the tape described herein attached to a surface of the structure. For example, in some embodiments, the layout tape described herein is applied directly to a layout structure to form a custom construction layout tool. In other embodiments, the graduations and other markings on the layout tape described herein are printed directly on a layout structure to construct a custom construction layout tool.

One embodiment of the present invention is a custom story pole. The term "story pole" as used herein refers to a stiff structure that is used to layout courses of construction materials, such as courses of masonry units or tile. Story poles are also referred to as corner poles in the trade. Story poles are often used to layout straight construction surfaces by marking courses along vertical and horizontal surfaces.

In typically use, the story pole is positioned proximate to a corner of the construction surface and parallel to an edge of the construction surface. The layout tape of the present invention can be applied directly to a surface of the story pole with an adhesive material in order to make a custom story pole for a particular application. Alternatively, the graduations and marking of the layout tape described herein can be printed directly on the story pole structure. In one embodiment, the layout tape of the present invention includes adhesive material on one side. In some embodiments, the adhesive material is protected by a removable strip.

Many construction layout tools, such as story poles are straight stiff structures. However, it should be understood that story poles according to the present invention can be constructed in any shape so as to conform to a particular construction surface, such as an arch. In one embodiment, the layout tape of the present invention is applied to masonry measuring tools, such as angle irons and other measuring devices. The layout tape of the present invention can be formed of a transparent material that allows the Craftsman or mason to view a measuring scale underneath the tape or the construction surface.

Figure 5:
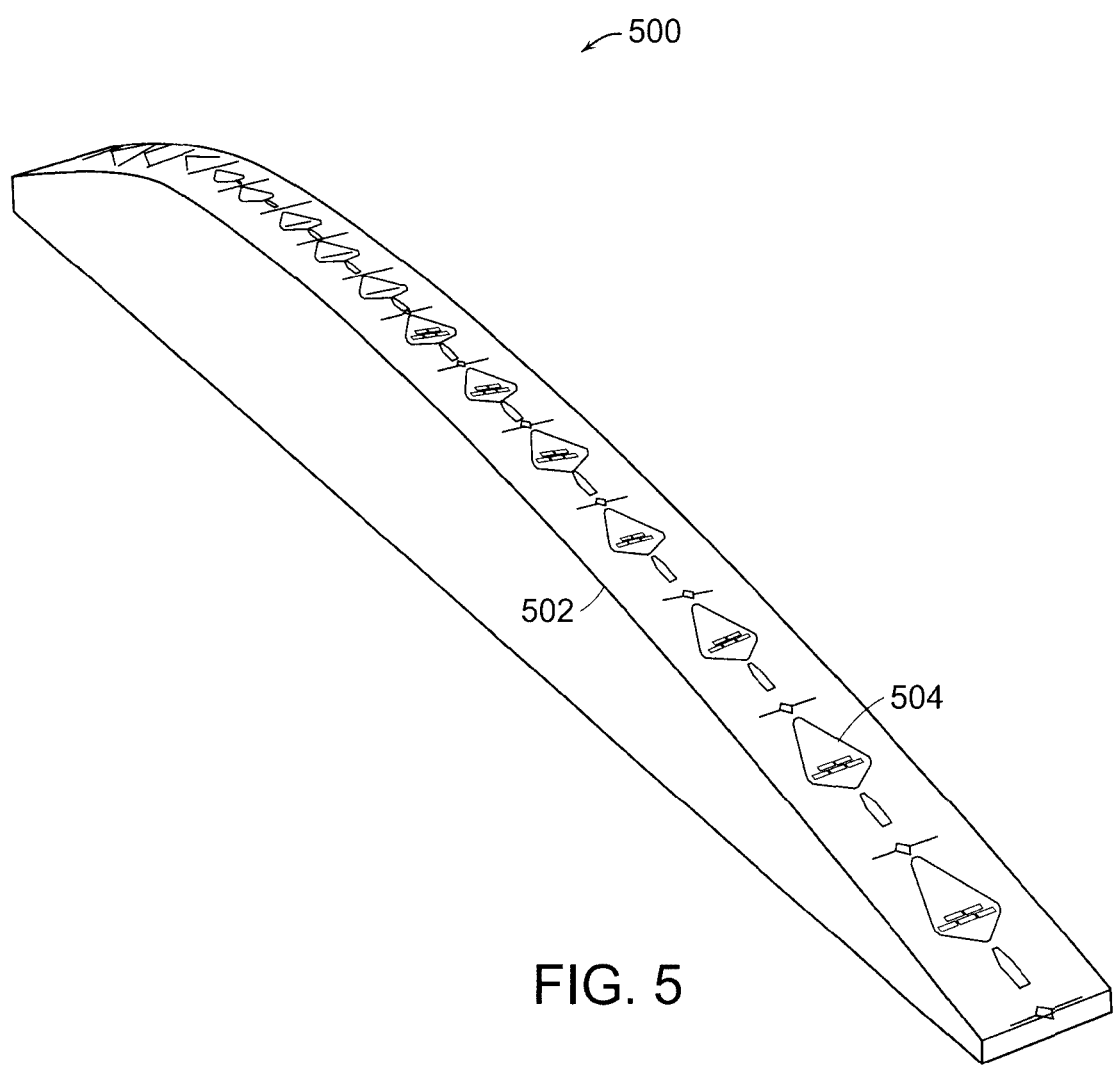
FIG. 5 is a drawing that shows a custom construction layout tool according to the present invention for laying out construction units on a curved surface.

FIG. 5 is a drawing that shows a custom construction layout tool 500 according to the present invention for laying out construction units on a curved surface 502. The curved surface 502 may be a construction surface or may be a building material. The drawing shows a curved surface 502, which can be a custom arch for a door or window. The drawing also shows the graduations and marking 504 described herein conforming to the curved surface.

Figure 6:
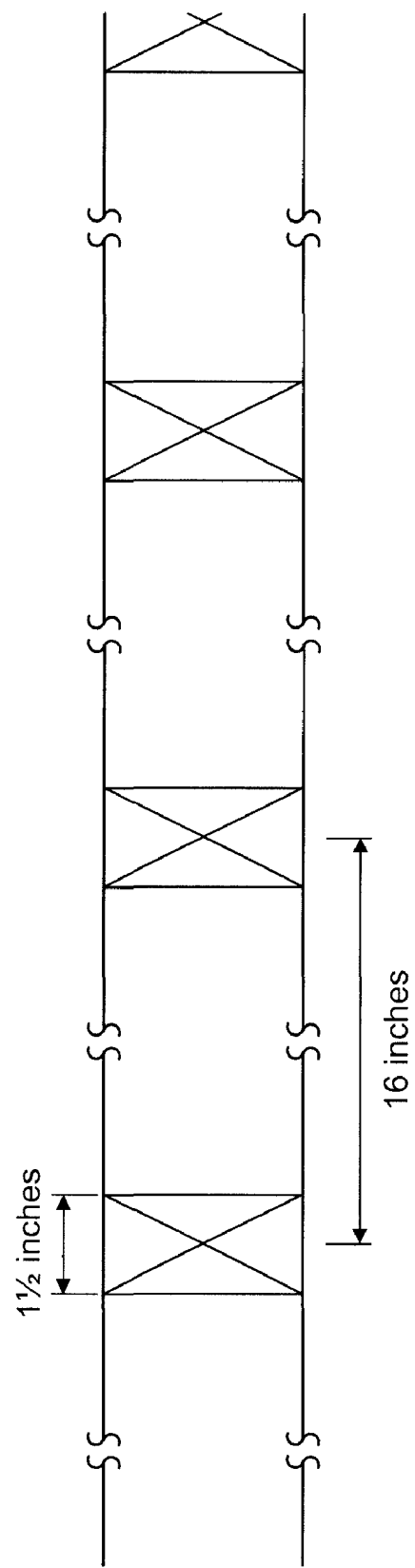
FIG. 6 illustrates a stud layout tape according to the present invention.

FIG. 6 illustrates a stud layout tape 600 according to the present invention. The stud layout tape 600 includes markings 602 that indicate where stud materials, such as 2×4 or 4×4 studs are to be positioned. For example, such a layout tape is useful for laying out studs for walls, floor joists, and ceiling rafters. Alternatively, the stud layout tape 600 can be used to indicate where stud materials are actually located. Using this alternative embodiment, a craftsman can use the stud layout tape 600 to easily and quickly position other materials and units to a completed wall. For example, the stud tape 600 can be used to mark positions for attaching shelving materials or book cases to a completed wall.

Many types of stud materials are positioned on sixteen inch centers as indicated by the marking 602 shown in FIG. 6. However, the stud tape of the present invention can be manufactured for any spacing. In the embodiment shown in FIG. 6, the markings 602 are indicated by large crosses that extend over the entire width of the stud, which is usually 1½ inches. Other types of markings 602, such as pictures of hammers or nails can also be used. The stud tape can be any width that is appropriate for the particular construction job.

In many embodiments, the stud layout tape according to the present invention conforms to the construction surface. In one embodiment, the stud layout tape according to the present invention is formed of a very low shrinkage material. For example, the stud layout tape of the present invention can be formed of UPVC or other similar materials as described herein. In one embodiment, the stud layout tape includes an adhesive material on at least one side that bonds the stud layout tape to a structure, such as a construction layout tool or a construction surface. In one embodiment, the markings 602 are printed on the adhesive side of the stud layout tape before the adhesive material is applied.

Equivalents

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the invention as defined by the appended claims.

What is claimed is:

1. A construction layout tool comprising:
    a) a structural element that is used to aid a craftsman in laying out construction units on a curved construction surface, a shape of the structural element being chosen to conform to a shape of a construction surface; and
    b) a non-metallic material that adheres to the structural element in a conformal manner, the non-metallic material including graduations which conform to the curved construction surface and that correspond to a combined thickness of a construction unit and at least one of a gap and adhesive material used to secure the construction unit to other construction units and to the curved construction surface.

2. The tool of claim 1 wherein the non-metallic material is at least semi-transparent so that the craftsman can view a surface on the structural element.

3. The tool of claim 1 wherein the structural element and the non-metallic material are formed in one structure.

4. The tool of claim 1 wherein both the structural element and the non-metallic material are formed of a transparent material.

5. The tool of claim 1 wherein the graduations correspond to a single construction unit.

6. The tool of claim 1 wherein the graduations correspond to at least two different construction units.

7. The tool of claim 1 wherein the graduations correspond to a combined thickness of a masonry unit and at least one mortar joint thickness.

8. The tool of claim 1 wherein both the structural element and the non-metallic material comprises a low shrinkage material.

9. The tool of claim 1 wherein the graduations are non-numeric graduations.

* * * * *